US005909911A

United States Patent [19]

Long

[11] Patent Number: 5,909,911

[45] Date of Patent: Jun. 8, 1999

[54] DEVICE FOR STABILIZING A DISASSEMBLY DEVICE DURING USE

[76] Inventor: James A. Long, 1741 Howell Rd., Hillsboro, Tenn. 37342

[21] Appl. No.: 08/644,058

[22] Filed: May 2, 1996

[51] Int. Cl.[6] .......................... B23P 19/04

[52] U.S. Cl. .......................... 29/259; 29/261; 29/270

[58] Field of Search .......................... 29/261, 259, 258, 29/266, 256, 252, 244, 242, 270, 278

[56] References Cited

U.S. PATENT DOCUMENTS

| | | | |
|---|---|---|---|
| 729,508 | 5/1903 | Phillips et al. . | |
| 1,109,942 | 9/1914 | Robbins | 29/258 |
| 1,352,990 | 9/1920 | Reinker . | |
| 1,891,869 | 12/1932 | Cox | 29/261 |
| 2,024,891 | 12/1935 | Spuler et al. . | |
| 2,272,636 | 2/1942 | Dennis . | |
| 2,589,075 | 3/1952 | Gravis . | |
| 3,986,242 | 10/1976 | Kerr . | |
| 4,781,086 | 11/1988 | Johnston . | |
| 5,138,917 | 8/1992 | Kirschner . | |
| 5,226,208 | 7/1993 | Gracey . | |
| 5,606,788 | 3/1997 | Rubino et al. | 29/259 |

*Primary Examiner*—David A. Scherbel
*Assistant Examiner*—Lee Wilson
*Attorney, Agent, or Firm*—Blank Rome Comisky & McCauley, LLP

[57] ABSTRACT

A device for stabilizing a disassembly device during use is disclosed. The disassembly device has a plurality of engaging/attaching members for gripping a workpiece and a cross member interconnecting the engaging/attaching members. In accordance with the present invention, the stabilizer device has a main shaft, at one end of which a handle is disposed and at another end of which a pair of fingers is disposed. The stabilizer device is used to grip the cross member of the disassembly device at two points along a length of the cross member so as to stabilize the disassembly device and the workpiece while a rotating motion or force is imparted to the disassembly device in order to perform the disassembly operation. The stabilizer device has an upper block and a lower block, and a portion of the main shaft of the stabilizer device is mounted so that, as the fingers are used to exert a pulling force on the cross members of the disassembly device, the main shaft exerts a pushing force on the disassembly device, thereby stabilizing the disassembly device during the disassembly operation.

12 Claims, 2 Drawing Sheets

DEVICE FOR STABILIZING A DISASSEMBLY DEVICE DURING USE

TECHNICAL FIELD

The present invention generally relates to a method and device for stabilizing a disassembly device during use, and more particularly to a method and device for preventing a disassembly device from rotating as it is manipulated in fixed engagement with a workpiece on which a disassembly operation is being executed.

BACKGROUND ART

Various disassembly devices, such as pullers and pushers, are well known in the prior art. In fact, numerous types of such devices are present in the marketplace.

For example, pullers of the prior art have a plurality of engaging or attaching members (e.g., jaws) which, when the puller is in place for operational use, grip a workpiece at its circumference. In order to perform the pulling operation, a centrally disposed threaded member of the puller, which is mounted in a threaded bore centrally disposed with respect to the engaging/attaching members and connected thereto by cross members, is rotated in a clockwise direction so as to cause a distal end of the threaded member to contact and push a central portion of the workpiece assembly while the engaging/attaching members of the puller are exerting a pulling force on the outer circumference of the assembly. As a result, the workpiece is disassembled.

A problem with conventional pullers and other similar devices resides in the fact that, in order to carry out the disassembly operation, a substantial rotating force must be applied, via a hex wrench or other similar tool, to the device (e.g., the centrally disposed threaded member of a puller). As a result, a turning or rotating force is applied to the disassembly device as a whole, and this tends to destabilize the engaging/attaching members as they attempt to grip the workpiece at its outer circumference.

The following patents are considered to be representative of the prior art relative to pullers and generally related devices: U.S. Pat. Nos. 729,508; 1,352,990; 2,024,891; 2,272,636; 2,589,075; 3,986,242; 4,781,086; 5,138,917; and 5,226,208. None of the aforementioned patents provides a solution to the above-described problem.

Therefore, there is a need in the prior art for the development of a method or device for stabilizing a disassembly device during use. More particularly, there is a need in the prior art for the development of a method or device which will prevent the disassembly device from becoming destabilized due to the production of undesirable rotating or turning forces during the disassembly operation.

DISCLOSURE OF INVENTION

The present invention generally relates to a method and device for stabilizing a disassembly device during use. More particularly, the invention relates to a method and device for stabilizing a disassembly device by counteracting or eliminating the effects of rotational forces exerted on the device during the disassembly operation.

Basically, the present invention calls for the provision of a stabilizer device having a main shaft, at one end of which is a handle and at another end of which is a pair of fingers, the pair of fingers gripping the cross member of the disassembly device at two points along a length of the cross member spanning the distance between the opposing engaging/attaching members of the device. At the same time that the fingers grip the cross member of the puller, the handle of the stabilizer device is rotated in a threaded bore located in a base connecting the pair of fingers to the handle, so that an end of the handle moves toward and abuts against a portion of the disassembly device. The combined operation of the fingers and the end of the handle of the inventive device stabilizes the disassembly device against adverse effects of the rotational forces exerted on the disassembly device during the disassembly operation.

Therefore, it is a primary object of the present invention to provide a method and device for stabilizing a disassembly device during use.

It is an additional object of the present invention to provide a method and device which counteract or eliminate the adverse effects of rotational forces exerted on the disassembly device during the disassembly operation.

It is an additional object of the present invention to provide a stabilizer device having a pair of fingers which grip a cross member of the disassembly device during the disassembly operation.

It is an additional object of the present invention to provide a stabilizer device having a handle which is threadably mounted in a base portion of the device and which, when rotated, causes an abutting end of the handle to contact a portion of the disassembly device, thereby further stabilizing the disassembly device during the operation.

The above and other objects, and the nature of the invention, will be more clearly understood by reference to the following detailed description, the appended claims, and the accompanying drawings.

BEST MODE FOR CARRYING OUT THE INVENTION

The device will now be described in more detail with reference to the various figures of the drawings. It should be noted that the invention is described with respect to its use to stabilize a gear puller, but that the use of the invention is much more expansive, and its use with a gear puller is only exemplary in nature. Thus, the stabilizer device of the present invention is not limited to use with pullers or pushers, but can be used with numerous disassembly devices of various types.

Figure 1:
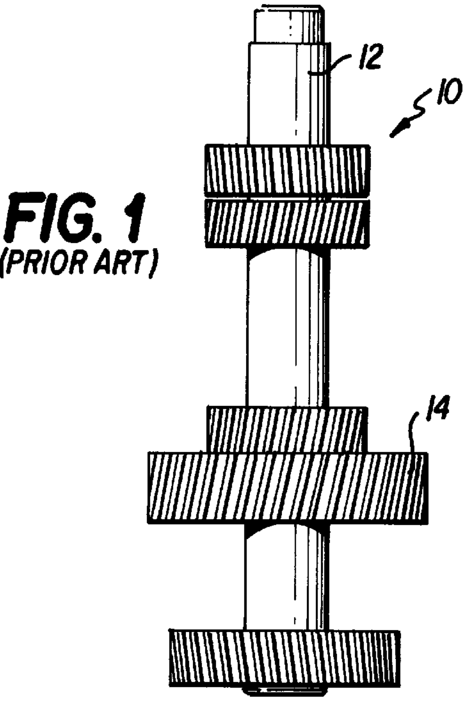
FIG. 1 (PRIOR ART)
FIG. 1 is a front view of a conventional gear assembly.
Figure 2:
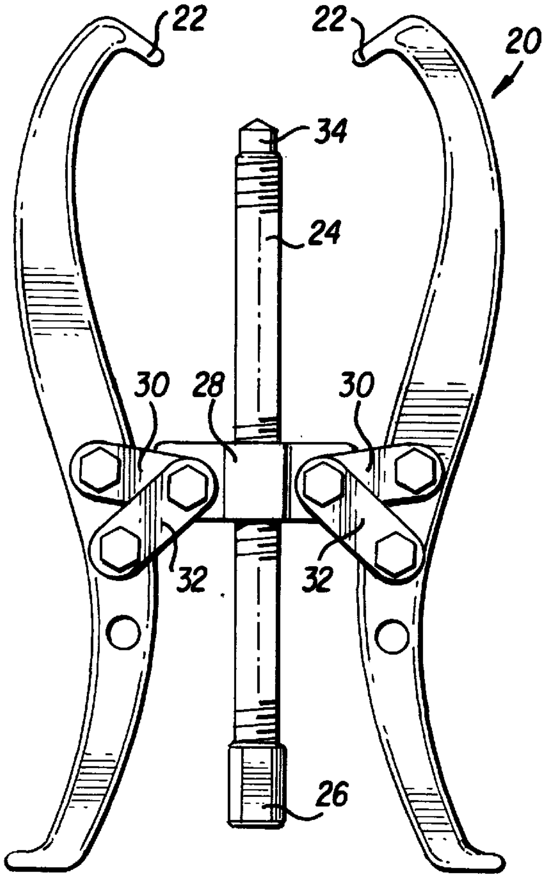
FIG. 2 (PRIOR ART)
FIG. 2 is a front view of a conventional puller.

FIG. 1 is a front view of a conventional gear assembly, while FIG. 2 is a front view of a conventional puller. As seen in FIG. 1, a gear assembly 10 has a shaft 12 on which various gears (for example, gear 14) are disposed. As seen in FIG. 2, the conventional gear puller 20 comprises jaws 22 and a threaded member 24. The threaded member 24 is centrally disposed between the jaws 22, and is connected to the jaws 22 via member 28 and cross members 30.

In the embodiment shown, the threaded member 24 is threadably mounted in a bore (not shown) contained in the member 28, and the member 28 is connected to the jaws 22 via cross members 30. It should be noted that the use of threads to mount member 24 to member 28 is merely exemplary in nature, and any other means for connecting member 24 to member 28 can be used. As is well known in the art, cross members 30 may be further supported by supports 32 extending between the member 28 and/or members 30, on the one hand, and the jaws 22, on the other hand.

Finally, the threaded member 24 has, at one end, a hex head 26 which can be engaged by a standard hex wrench or socket wrench of appropriate size for the purpose of rotating the threaded member 24 in a clockwise direction. Thus, when used in a gear pulling operation, the gear puller 20 is positioned relative to the gear assembly 10 so that the jaws 22 grip or clamp onto a circumferential portion of one of the gears—for example, gear 14. At the same time, an appropriate tool is used to rotate hex head 26 and, thus, threaded member 24 in a clockwise direction, causing an end 34 of threaded member 24 to move toward and contact, and exert a pushing force against, an interior portion of the gear assembly 10, specifically, the shaft 12. As a result, a pushing force is exerted on the shaft 12 at the same time that a pulling force is exerted, by jaws 22, on a circumferential portion of the gear 14, and the result is that the gear 14 is disassembled from the gear assembly 10.

In the latter regard, it should be noted that some pullers grip an interior, rather than exterior, portion of the gear assembly 10. In any event, a problem is encountered during the rotation of hex head 26 and threaded member 24 using an appropriately sized hex wrench or socket wrench. Typically, as a rotating force is exerted on hex head 26, that rotational force is transmitted to the gear puller 20 as a whole, and this causes the jaws 22 to become destabilized with respect to their gripping position relative to gear 14. As mentioned earlier, there is a need in the prior art for a solution to this problem.

Figure 3:
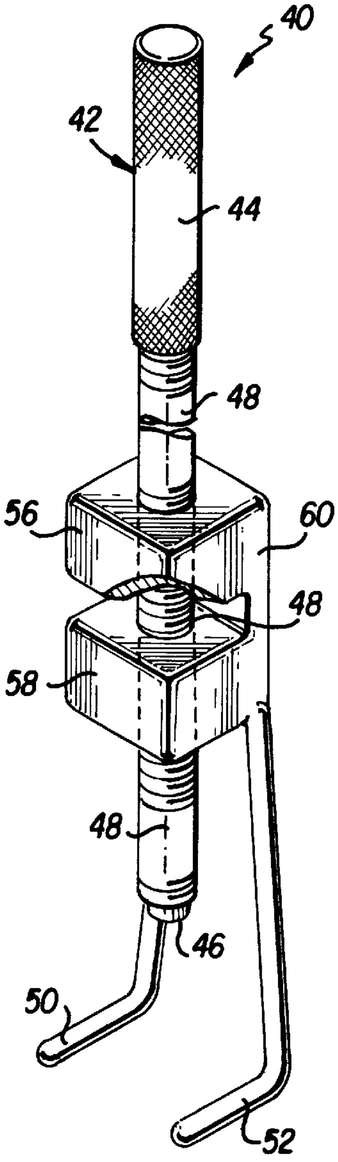
FIG. 3 is a respective view of the device of the present invention.

FIG. 3 is a perspective view of the stabilizer device of the present invention. As seen therein, the stabilizer device 40 comprises a main shaft 42 having a handle 44, at one end, and having a threaded portion 48 located along the remainder of the main shaft 42. In addition, the main shaft 42 has a distal or abutting head or end 46 located remote from the handle 44. The stabilizer device 40 further comprises a base portion 54 which, in turn, comprises upper block 56, lower block 58 and rear block 60.

As further seen in FIG. 3, the threaded portion 48 of main shaft 42 is mounted in threaded bores (not shown) contained in upper block 56 and lower block 58. The upper block 56 and lower block 58 are interconnected by rear block 60, to which fingers 50 and 52 are fixed and connected. As shown in FIG. 3, the fingers 50 and 52 are bent to define end portions which are remote from the base portion 54. In this particular embodiment, the end portions of the fingers extend in the same direction. It should be recognized that fingers 50 and 52 and rear block 60 can be formed into a single, integrated piece, and can be of any size or shape. For example, fingers 50 and 52 can be round or square, and they can be removable as well. Moreover, fingers 50 and 52 can be formed into curved or semi-circular configurations (rather than the right-angle configuration shown in FIG. 3) so as to allow extra clearance for stabilizing odd-shaped pullers.

Shaft 42 and blocks 56 and 58 do not have to be threaded, in which case shaft 42 is implemented by a sliding shaft (as in a caulking gun) or by a locking lever (as in a pair of vice-grip pliers). Moreover, blocks 56 and 58 can be implemented by any structure suitable for guiding or mounting end 46 and fingers 50 and 52. Finally, handle 44 can have any size or cross-sectional shape (T-shape, square or round).

The gear pulling operation and use of the stabilizer device of the present invention will now be described with reference to FIGS. 4 and 5, which are front and right side views, respectively, of the gear puller used to perform a gear pulling operation relative to the gear assembly while using the stabilizer device of the present invention. However, it should be recognized that use of the stabilizer device of the present invention is not limited to gear pulling operations. That is, the stabilizer device of the present invention can be used in any number of other pulling operations, and for that matter in any number of disassembly operations, regardless of whether they involve pulling, pushing or other activity.

Figure 5:
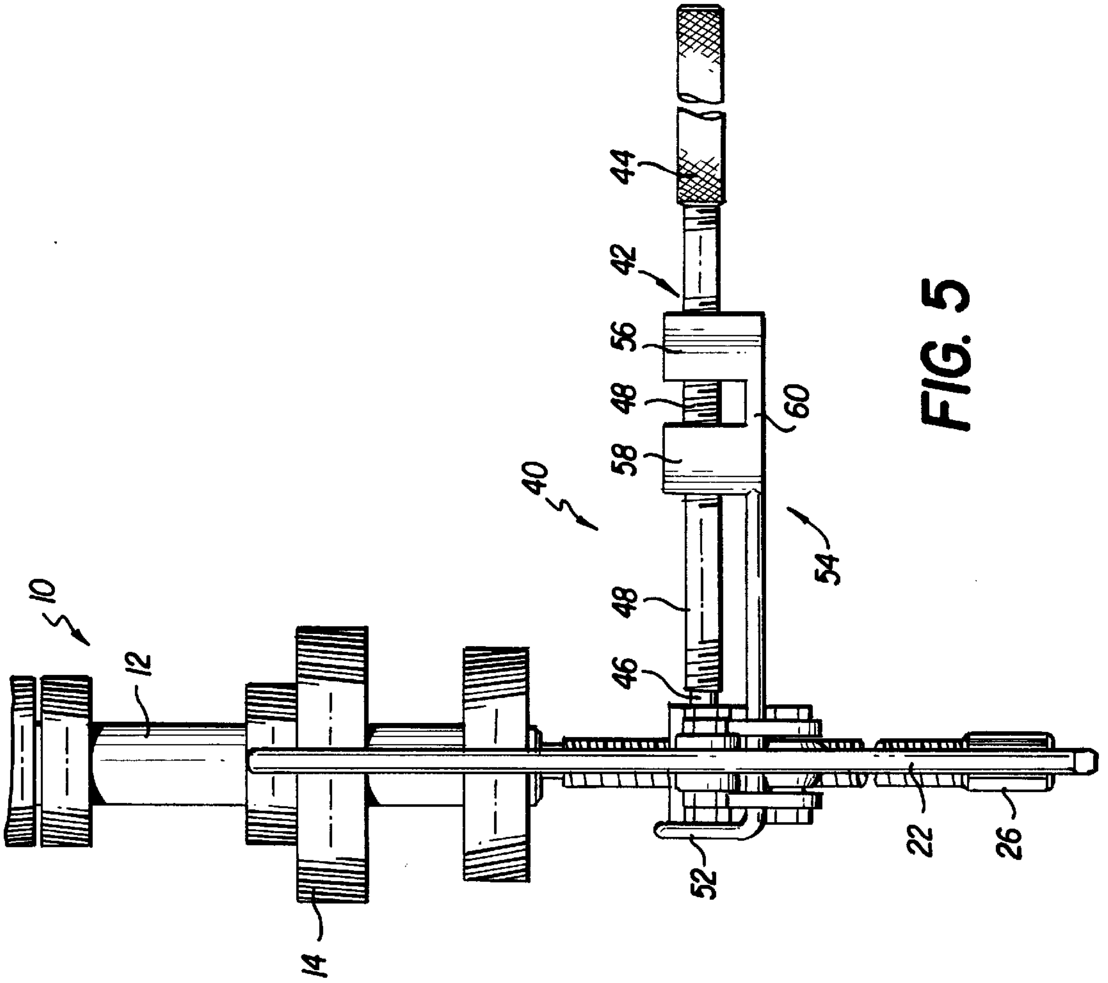
FIG. 5 is a left side view of a conventional gear assembly on which a gear pulling operation is being performed by a conventional gear puller using the stabilizer device of the present invention.
Figure 4:
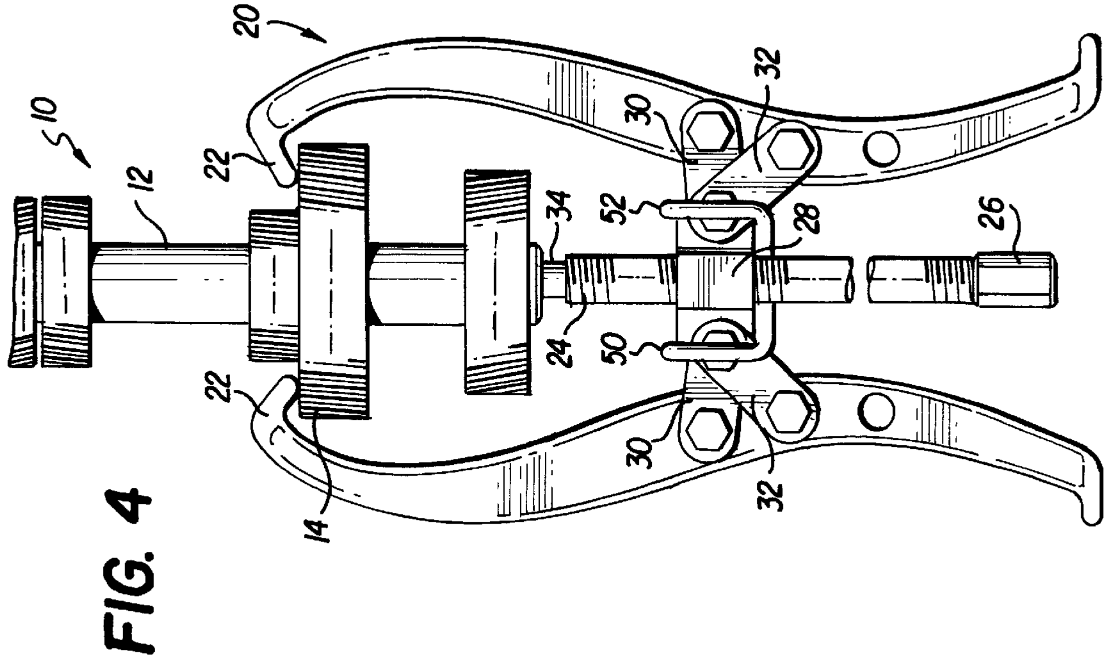
FIG. 4 is a front view of a conventional gear assembly on which a gear pulling operation is being carried out by a conventional gear puller using the stabilizer device of the present invention.

As seen in FIGS. 4 and 5, in order to perform a gear pulling operation, the gear puller 20 is positioned relative to gear assembly 10 so that jaws 22 of gear puller 20 grip a circumferential portion of the gear 14. At the same time, hex head 26 is rotated in a clockwise direction (when viewed from the bottom in FIGS. 4 and 5) so that threaded portion 24 rotates through the bore (not shown) in member 28, causing a distal end 34 of threaded member 24 to move into a center portion of gear assembly 10. As a result, as previously described, a pushing force is exerted on the center portion or shaft 12 of gear assembly 10, while a pulling force is exerted by jaws 22 on gear 14, thereby causing disassembly of the gear assembly 10. As also mentioned previously, without the use of the present invention, rotation of hex head 26 can lead to destabilizing of the gear puller 20 as a result of the transmission of rotational forces thereto.

In accordance with the present invention, prior to rotation of hex head 26, the stabilizer device 40 is placed so that fingers 50 and 52 partially encircle member 28, cross members 30 and supports 32 of gear puller 20. At the same time, the handle 44 of stabilizer device 40 is rotated in a clockwise direction through upper block 56 and lower block 58, causing the distal or abutting end 46 of main shaft 42 to move toward and contact the member 28 of gear puller 20. Thus, fingers 50 and 52 exert a pulling force on cross members 30 and supports 32 (connected to member 28), while the abutting end 46 of main shaft 42 exerts a pushing force against member 28 of gear puller 20. As a result, stabilizer device 40 exerts a stabilizing influence on the gear puller 20 so that, when hex head 26 is rotated in order to perform the gear pulling operation, the rotational forces which would otherwise be transmitted to the gear puller 20 and cause instability therein are counter-acted or eliminated.

While preferred forms and arrangements have been shown in illustrating the invention, it is to be understood that various changes and modifications can be made without departing from the spirit and scope of this disclosure. In particular, it should be recognized that the invention can be used with various pullers (inside-grip or outside-grip pullers), and with pullers having any number of engaging/attaching members or jaws. In fact, use of the stabilizer device of the present invention is not limited to gear pulling operations; it can be used in any number of other disassembly operations involving pushing or other activity. Thus, the above description of the use of the stabilizer device of the present invention is strictly exemplary in nature, and the stabilizer device of the present invention has a wide range of usage in any number of pulling, pushing or other disassembly operations.

I claim:

1. A combination comprising:

a disassembly device; and a stabilizing device for stabilizing said disassembly device;

said disassembly device having a plurality of engaging members for engaging an assembly and a cross member interconnecting said engaging members; and said stabilizing device comprising:

a main shaft having a handle at one end and an abutting head at another end;

a base element having a bore for receiving said main shaft so as to mount said base element on said main shaft; and finger means connected to said base element and extending in a direction away from said handle for gripping said cross member to stabilize said disassembly device;

wherein said base element comprises an upper block engaged with said main shaft at a point nearest said handle, a lower block engaged with said main shaft at a point nearest said finger means, and a joining block interconnecting said upper block and said lower block and connected to said finger means.

2. The combination of claim 1, wherein said abutting head is located nearest to said finger means for abutting against and stabilizing said disassembly device.

3. The combination of claim 1, wherein said finger means comprise a pair of fingers extending from said joining block.

4. The combination of claim 3, wherein the fingers are bent to define end portions which are remote from said base element, the end portions of the fingers extending in a same direction.

5. The combination of claim 1, wherein said joining block comprises a rear block interconnecting said upper block, said lower block and said finger means.

6. The combination of claim 1, further comprising engaging means disposed on at least one of said main shaft and said base element for establishing mutual engagement between said main shaft and said base element.

7. The combination of claim 6, wherein said engaging means comprises threading on at least one of said main shaft and said base element.

8. The combination of claim 7, wherein said main shaft is threaded along a length between said handle and said abutting head.

9. The combination of claim 8, wherein said bore of said base element is threaded.

10. The combination of claim 7, wherein said bore of said base element is threaded.

11. A combination comprising:

a disassembly device; and a stabilizing device for stabilizing the disassembly device; wherein:

said disassembly device comprises a gear puller having a plurality of engaging members for engaging a gear and a cross member interconnecting said engaging members; and said stabilizing device comprises:

a main shaft having a handle at one end and an abutting head at another end;

a base element having a bore for receiving said main shaft so as to mount said base element on said main shaft; and finger means connected to said base element and extending in a direction away from said handle for gripping said cross member to stabilize said disassembly device;

wherein said base element comprises an upper block engaged with said main shaft at a point nearest said handle, a lower block engaged with said main shaft at a point nearest said finger means, and a joining block interconnecting said upper block and said lower block and connected to said finger means.

12. A combination comprising:

a disassembly device; and a stabilizing device for stabilizing said disassembly device;

said disassembly device having a plurality of engaging members for engaging an assembly and a cross member interconnecting said engaging members; and said stabilizing device comprising:

a main shaft having a handle at one end and an abutting head at another end;

a base element having a bore for receiving said main shaft so as to mount said base element on said main shaft; and finger means connected to said base element and extending in a direction away from said handle for gripping said cross member to stabilize said disassembly device.

* * * * *